May 16, 1950 H. O. PETERSON 2,507,735

AUTOMATIC TUNING CONTROL APPARATUS

Filed Nov. 2, 1944 4 Sheets-Sheet 1

INVENTOR
HAROLD O. PETERSON.
BY H. S. Grover
ATTORNEY

May 16, 1950 H. O. PETERSON 2,507,735

AUTOMATIC TUNING CONTROL APPARATUS

Filed Nov. 2, 1944 4 Sheets-Sheet 2

INVENTOR
HAROLD O. PETERSON.
BY H. S. Grover
ATTORNEY

AUTOMATIC TUNING CONTROL APPARATUS

Filed Nov. 2, 1944

INVENTOR
HAROLD O. PETERSON.
BY H. S. Grover
ATTORNEY

May 16, 1950 H. O. PETERSON 2,507,735

AUTOMATIC TUNING CONTROL APPARATUS

Filed Nov. 2, 1944 4 Sheets-Sheet 4

INVENTOR
HAROLD O. PETERSON.
BY H. S. Grover
ATTORNEY

Patented May 16, 1950

2,507,735

UNITED STATES PATENT OFFICE 2,507,735

AUTOMATIC TUNING CONTROL APPARATUS

Harold O. Peterson, Riverhead, N. Y., assignor to Radio Corporation of America, a corporation of Delaware Application November 2, 1944, Serial No. 561,564

8 Claims. (Cl. 250—20)

Figure 1:
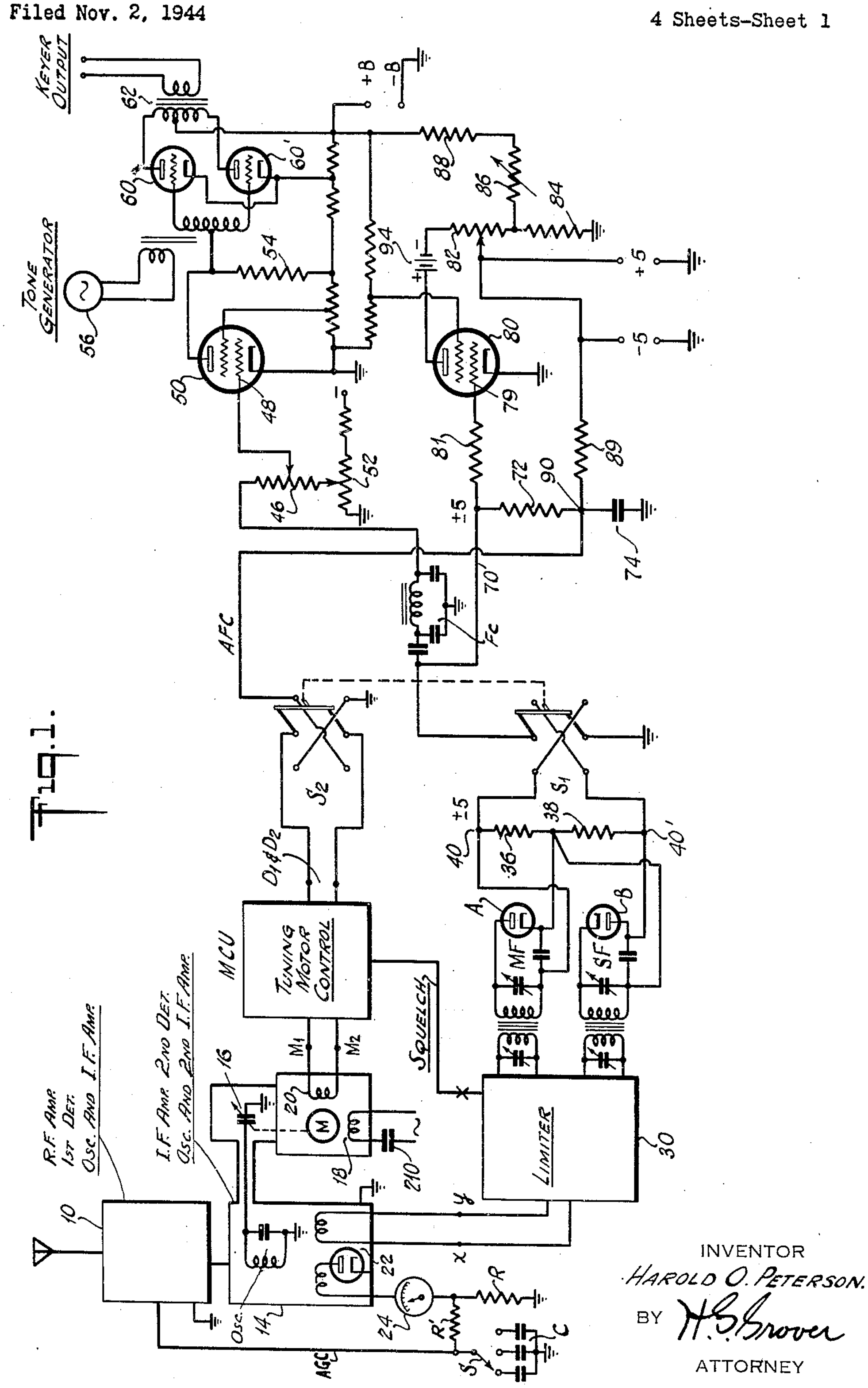

This application concerns telegraphy communications systems and in particular, receivers of wave energy shifted in accordance with signals from a first frequency representing mark to a second frequency representing space and vice versa. The first and second frequencies are separated in the frequency spectrum the desired amount depending on the use to which the system is to be put and at least an amount sufficient to permit the receiver discriminator to respond properly to the mark and space frequencies. Signalling in this manner has become known in the art as frequency shift communication or space wave signalling. Systems using this method are treated in some respects at least as frequency modulation systems since currents are shifted in frequency by the signals. The marking and spacing frequencies are never on simultaneously.

The general object of my invention is improved communication by frequency shift telegraphy signals.

More specifically, an object of my invention is improved reception of telegraphy signals comprising one frequency representing space elements and another frequency representing mark elements.

This general object is attained by provision of an improved receiver system wherein double heterodyning is used with automatic frequency control of the second heterodyning oscillator which preferably operates at an intermediate frequency and supplies from the second mixer output a superaudible frequency. The automatic frequency control is by way of a variable condenser in the second oscillator circuit, driven by a reversible motor of the two-phase winding type, one phase being supplied by a power source, the other phase being supplied in phase quadrature (advanced or retarded) from a tuner motor control unit excited by potential derived at the receiver discriminator and detector output for this purpose and for recording. The tuner motor control is similar in some respects to that disclosed in Fig. 2 of Crosby U. S. Patent #2,380,947, dated August 7, 1945.

In systems of this nature known in the prior art, in the absence of signals or loss of signal strength, the motor may tune the receiver so far out of the channel in which it is arranged to operate that when the signal is on again and/or of good (usable) strength the automatic frequency control system is then incapable of taking over control of the tuning.

A specific object of my invention is improved means of inhibiting operation of the motor in the absence of signal by rendering inoperative the motor control unit or a portion thereof supplying one of the phases of the two-phase reversible tuner motor.

This object is attained by using the change in voltage in a current amplitude limiter stage operating at a superaudible frequency to control a squelch tube operating through change in its anode current to permit or inhibit supply of current to the said one phase winding of the tuner motor by the control unit. The arrangement is such that in the presence of normal signal input the said one phase winding of the tuner motor receives current and the automatic frequency control functions. In the absence of this signal or loss of strength thereof the said one winding is robbed of current and the tuner motor stops operation.

For recording purposes a negative voltage is used on mark and a preferably equal and positive voltage on space or vice versa. The discriminator and detector is accordingly arranged to provide these potentials of opposed polarity as the frequency of the incoming wave is varied from space frequency to mark frequency and vice versa. To do this a discriminator and a differential detector arrangement (as in Conrad U. S. Patent #2,057,640, dated Oct. 13, 1936) is used, which gives about zero direct output when the frequency is midway between mark and space. Note in this consideration that the signal may be considered a current which is on continuously and is shifted from say mark frequency through the entire separation band to space frequency and vice versa, so that the frequency of the current passes through intermediate frequency to mark and space frequencies during shifts and the frequency spectrum between mark and space is taken up to a considerable extent by side frequencies, the number of important ones of which depends upon the keying rate, etc. The control unit is conveniently arranged to hold the tuner motor in a stationary position when zero direct current is applied to one of its input terminals. Then a small amount of direct current potential, resulting from drift of the mean signal frequency, on the control unit input acts through the control unit to turn the motor in the proper direction to change the frequency of the second heterodyning oscillator to recenter the superaudible output of the second mixer which is fed through the limiter to the discriminator and the detectors. If the drift is in one direction, the small amount of direct current potential is positive, while if the drift is in the other direction the small amount of direct current potential is negative. It will be understood, however, that the potentials here are relative and all that is necessary is that the same is changed above or below a base value for opposite drifts in the mean frequency of the energy supplied to the discriminator.

This requires means for relating the plus and minus direct current potentials generated in the discriminator output for recording purposes to the about zero potentials needed to operate the control unit for the tuner motor, and an object of this invention is to provide an improved compensating circuit arrangement for introducing into the connections between the detector output and the control unit input compensating direct current voltages. This means in broad respects is similar to the means disclosed in Crosby U. S. Patent No. 2,462,470 dated February 22, 1949, for about the same purpose.

In case the transmission is reversed the recording apparatus will operate at mark instead of space and vice versa. The tuning control operation described briefly above will be reversed. An object of the present invention is to provide means for reversing the polarity of the discriminator detector output and the effective polarity of the potential supplied to the tuning motor control unit so that proper recording and proper tuning is carried out in all circumstances.

The manner in which the above objectives are attained and the advantages derived from attaining the same will appear from the detailed description which follows.

In this description reference will be made to the drawings wherein Fig. 1 illustrates diagrammatically and partially by rectangle a frequency shift or spaced wave receiver arranged in accordance with my invention. This receiver includes the two heterodyning stages, the motor control unit for the second heterodyning oscillator, the current amplitude limiter, the differential detector coupled therewith, the recording means and the reversing switch connecting the differential detector output to the recording means, the motor control unit, the squelch circuit coupling the limiter to the motor control unit, the compensation circuits coupling the differential detector output to the motor control unit and the reversing switch therein.

Figure 2:
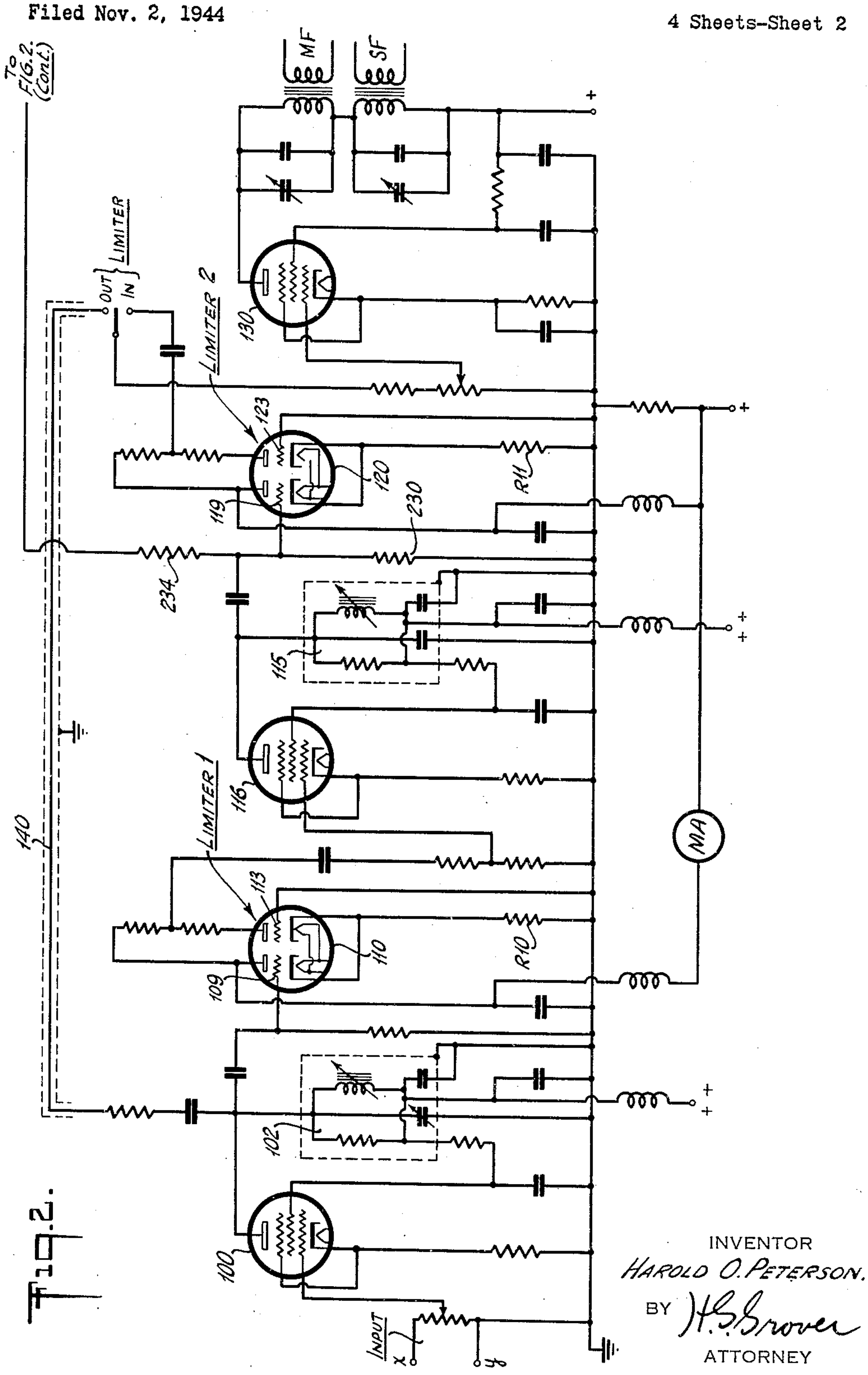
Figure 2:
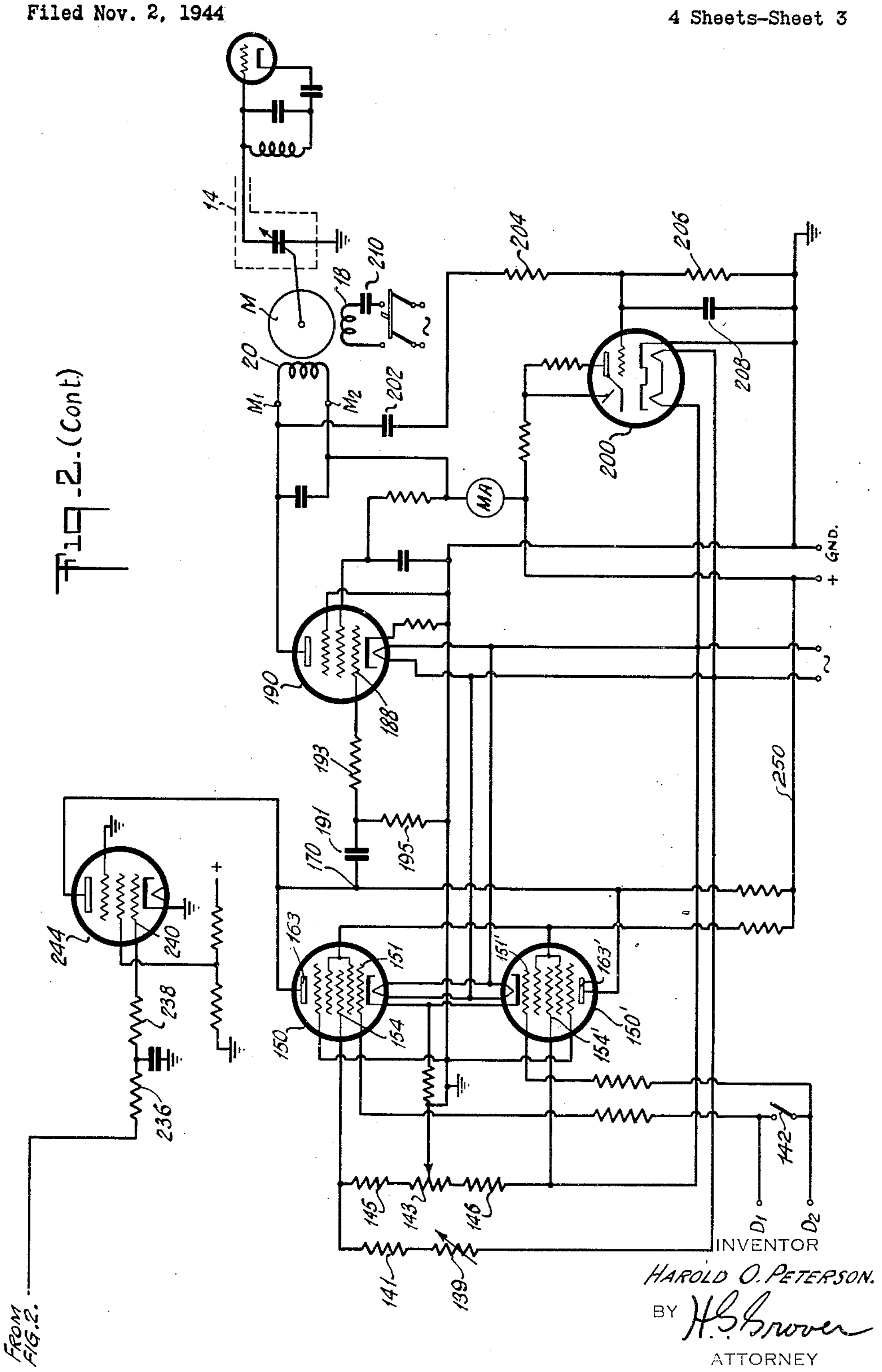
Figure 3:
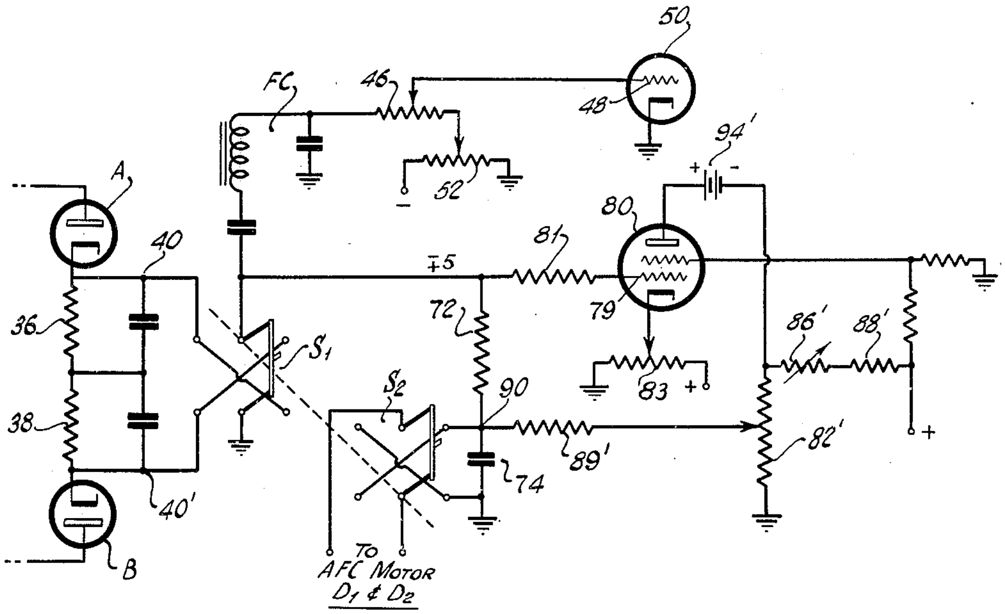

Fig. 2 illustrates details of the limiter circuit operating in the present application at superaudible frequency, the motor control unit, the squelch tube coupling a limiter stage circuit to the motor control unit for permitting or inhibiting operation of the motor connected to the reactance tuning the second oscillator; while, Fig. 3 illustrates a modified compensating circuit to be used between the detector output and the tuner control unit input.

In Fig. 1, 10 is a radio frequency amplifier wherein the wave energy is received and amplified. The amplifier in the embodiment used includes radio frequency amplifiers, a first detector or mixer, and first oscillator and intermediate frequency amplifiers. In the embodiment described, the receiver 10 had an output at 300 kc. The circuits in this unit are not per se claimed herein and the same will not be described in detail. One or more amplifier stages in this unit 10 are controlled as to gain by automatic gain control potentials derived from the stage 14.

The 300 kc. output from the stage 10 is supplied through amplifiers if desired, to a second mixer in the unit 14 wherein it is mixed with oscillations from a generator therein to supply an output from the stage 14 of lower frequency. In the receiver described, the output supplied to the limiter 30 is at 50 kc. The oscillator in unit 14 has as a frequency determining reactance, a condenser 16 driven by a motor M of the two phase winding type having one winding 18 supplied by alternating current (say at 115 volts and 60 cycles/sec.) of a first frequency and phase and a second winding 20 supplied by current of the same frequency displaced in phase and of reversible phase.

The unit 14 includes amplifier stages and a gain control potential diode detector 22 in a circuit including, if desired, a current meter 24 and a resistance R shunted by another resistance R' in series with a condenser C selected for size by a switch S to provide across R a gain control potential for the stages in unit 10, the time constant of which can be adjusted by adjusting the value of the C in the RC network.

The intermediate frequency energy from the stage 14 is fed to a limiter 30 wherein amplitude variations in the keyed currents are leveled off to supply to a discriminator circuit amplitude limited current of about 50 kc. which shifts in frequency from marking frequency to spacing frequency and vice versa.

The discriminator circuit is of the Conrad type and comprises a circuit MF transformer coupled to the limiter output and tuned to the mark frequency, and a circuit SF transformer coupled to the limiter output and tuned to the space frequency. The tuned circuits MF and SF are coupled differentially to diode detectors A and B having as load impedances resistances 36 and 38 differentially arranged.

The operation of this discriminator is well known in the art and will not be described in detail herein. It will be noted that the circuits MF and SF are tuned to the mark and space frequencies and when operation is normal these frequencies are symmetrically related to the mean frequency. Switch S1 is now assumed to be to the left to ground the end 40' of resistance 38 connected to the anode of diode B. In the presence of mark the incoming wave shifts toward the frequency of circuit MF to produce at the point 40 a negative potential. In the embodiment constructed this potential was made to be about −5 volts D. C. In the presence of space the current frequency shifts towards the frequency to which circuit SF is tuned to produce at 40 a positive potential. In the embodiment used, a positive potential of about +5 volts is developed at point 40. When the switch S1 is moved to the right and closed, the operation is reversed because then the end of resistance 36 connected to the anode of diode A is grounded. If the transmission is reversed the −5 volts is produced at point 40' on mark (formerly space) and the +5 volts is produced at point 40' on space (formerly mark).

The direct current potentials developed across resistances 36 and 38 as the incoming signal is keyed from mark to space, is relayed to a reversing switch S1 and through the switch to a filter circuit FC which blocks out the direct current voltage. The alternating potentials representing mark and space (and also slow variations to be corrected) are passed from the filter circuit FC by way of a potentiometer resistance 46 to the control grid 48 of a tone keyer tube 50. In order to provide the desired biasing potentials for the grid 48, the potentiometer resistance 46 is connected to the movable point on a resistance network 52, one terminal of which is grounded and the other terminal of which is connected to a point of negative direct current potential. The cathode of the tube 50 is grounded. The anode of tube 50 is connected to a source of direct current potential by way of resistances including a resistance 54. The resistance 54 is connected to a bleeder circuit across the direct current supply source. The amplifier and keyed stage tubes 60 and 60′ have their cathodes connected to the bleeder circuit as does the screen grid of tube 50. A tone generator 56 supplies oscillations of tone frequency to the input electrodes of the tone keying and amplifying stage tubes 60 and 60′. The output of this stage supplies keyed tone for recording purposes. The tubes 60 and 60′ are supplied grid bias which depends in part on the current through resistance 54 and varies therewith. The values of the resistances in the bleeder circuit are such that when tube 50 is cut-off and no plate current flows in resistance 54, tubes 60 and 60′ are conductive to amplify oscillations of tone frequency and feed the same to the recorder. The recorder (not shown), may be connected to the secondary winding of transformer 62 and may be at the receiver or at a remote point, in which case the recorder is connected by land lines to the secondary winding of transformer 62. The tone generator, tone keyer, and amplifier used here are known in the art and have been described and claimed in prior patents such as, for example, Beverage U. S. Patent #2,070,418, dated Feb. 9, 1937, Beverage U. S. Patent #1,874,866, dated Aug. 30, 1932, etc.

It must be remembered that during operation the current out of the limiter is either of mark or space frequency or thereabout. Also, that when the receiver is properly tuned, as it will be by my automatic tuning control means, mark frequency will coincide with the frequency to which the circuit MF is tuned, and space frequency will coincide with the frequency to which circuit SF is tuned. Therefore, at the point 40 will appear a negative or a positive potential when the system is in operation and these potentials will be about equal when the receiver is properly tuned. Unequal potentials will, however, also operate the keyer.

When marking signals come through, a negative potential is developed at point 40 and the grid 48 is biased negative to cut off current in tube 50 so that the potential of the control grids of the tubes 60 and 60′ becomes more positive and tone current goes through this tone keyer and amplifier. When a spacing element comes in, the potential at point 40 becomes positive. The control grid 48 now becomes more positive and the tube 50 becomes conductive through the resistance 54. This places a more negative bias on the control grids of the keyed tone amplifier tubes 60 and 60′ to cut this amplifier stage off or block the same to prevent oscillations of tone frequency developed in 56 from reaching the output transformer 62.

The changing potential at point 40 is also supplied by lead 70 and resistance 72 to a point 90 at one terminal of condenser 74, the other terminal of which is grounded. The voltage developed across the condenser 74 is supplied by a lead marked AFC to two contacts of a second reversing switch S2 and then as input at D1 or D2 to a motor control unit MCU which controls the operation of the motor M connected with the condenser 16 in the second heterodyne oscillator circuit for automatic frequency control purposes. In each position of the switch S2 one of the points D1 or D2 is grounded and the potential developed at point 90 is applied to the other of the points D2 or D1.

As described in detail hereinafter, the motor control unit is arranged to hold the motor substantially stationary when voltage of about zero direct current value appears at the points D1 or D2. Since in the arrangement described herein a direct current voltage of about ±5 volts is developed at point 40 in the presence of keying, some means is necessary to compensate these direct current voltages to supply the substantially zero direct current voltage at point D1 or D2 when the system is operating normally, that is, when marking currents out of the limiter 30 are of the frequency to which the discriminator circuit MF is tuned and when spacing currents out of the limiter 30 are of the frequency to which the discriminator circuit SF is tuned.

The plus and minus direct current voltages at point 90 are compensated by means of a tube 80 and a resistance network, including resistors 82, 84, 86, and 88. It should be remembered that at the point 40, or if the switch S1 is reversed, at the point 40′, there is produced in the presence of spacing and under normal operation a positive potential and in the presence of marking and under normal operation, an equal negative potential. One or the other of the potentials is present during the keying operations but they are not produced simultaneously. The control grid 79 of tube 80 in the presence of marking currents is biased to cut off by the negative potential developed at point 40 or point 40′. Then this tube does not draw current and the resistances 82, 84, 86, and 88, and the source B to which resistor 88 is connected, are dimensioned and arranged so that a positive potential is developed at the adjustable tap on resistor 82. The resistance values and the source of direct current B are such that by adjustment of resistor 86 this positive potential just compensates the said negative potential developed at point 90 by marking currents to supply a zero direct current potential over the automatic frequency control lead to switch S2 and point D1 or D2.

When spacing currents appear in the system, a positive potential is developed at point 40 or point 40′ and supplied to the control grid 79 of tube 80 and to the point 90. The tube 80 now draws current to produce a potential drop in resistances 82 and 84. The bias of the grid 79, the source 94, and the resistances in the connections are so arranged that the resistance 82 supplies to the point 90 a negative potential just sufficient to compensate the positive potential developed at the point 90 in the presence of spacing currents so that about zero direct current potential is supplied over the line AFC and through the switch S2 to point D1 or D2. The amount of current drawn by the tube 80 when the signal is on space frequency is substantially constant because resistor 81 prevents the grid 79 from going more than a small amount positive. The signal level at the discriminator input, that is, at the output of limiter 30, is substantially constant in amplitude for normal received signal levels because of the operation of the automatic gain control applied to the stages in unit 10 and because of the limiting action to which the current amplitude is subjected in the limiter 30.

Now assume that the received frequency shift energy has deviated in means frequency so that the mean frequency has shifted somewhat with respect to a frequency intermediate the frequencies to which the circuits MF and SF are tuned. Assume, for example, that the mean frequency has shifted in such a direction that the marking elements produce at 40 a more than normal negative potential. The tube 80, biased to cutoff by this negative potential, does not draw anode current and the resistances 82, 84, 86, and 88 supply at the point 90 the usual positive direct current potential. This direct current potential is not sufficient to overcome the negative potential developed in the presence of mark at the point 90 and a small negative potential is supplied over the AFC lead to the point D1 or D2 to cause the tuning motor to turn in a direction such that the second oscillator in the unit 14 has its frequency changed an amount sufficient to supply to the limiter 30 a supersonic output of the proper frequency to bring the system back to normal operation so that equal and opposed polarity direct current voltages are developed at the point 40. The tuning motor M and the tuning control circuit MCU are so arranged and related that the frequency corrections are made in the proper quantities and the proper directions to keep the voltages at the point 90, and in particular on terminals D1 or D2, at substantially zero direct current voltage during operation.

As seen by reference to Fig. 2, the limiter in the unit 30 comprises two limiter stages 110 and 120 with an amplifier stage 100 supplying input to the first limiter stage 110 and a second amplifier stage 116 supplying input to the limiter stage 120. An additional stage 130 supplies the limited output to the discriminator circuit shown in Fig. 1 and omitted in Fig. 2. The features of the limiter are not claimed herein and will not be described in detail. It will be noted, however, that the amplifier stage 100 is at its input connected at points X and Y, Figs. 1 and 2, to the output of the supersonic amplifier 14. The output of the amplifier stage 100 is coupled by a filter network 102 to the input of the first limiter stage 110. The filter network 102 is tuned to pass substantially only the supersonic output of stage 14, but does pass a band sufficiently wide to include the marking and spacing frequencies and the necessary side band frequencies. In the embodiment operated, the limiter stages operated at 50 kc. and the network 102 was tuned substantially to resonance at this frequency to offer a high impedance to signals of this frequency and to shunt out signals of other frequencies.

The limiter stages 110 and 120 are coupled by a somewhat similar amplifier stage 116 having in its output a filter 115.

The limiters 110 and 120 each comprise two electronic discharge systems with common cathode resistors R10 and R11 respectively. These limiters are substantially as described in detail in Crosby U. S. Patent #2,276,565, dated March 17, 1942, and will not be described in full detail herein. However, it will be noted that the first electronic stage of each of the limiters 110 and 120 is so arranged and biased that the negative half-cycles of the incoming wave operate this stage to cut off so that negative limiting takes place on the negative half-cycles of the keyed supersonic signals. On the positive half-cycles of these signals, the control grids 109 and 119 of the first stage in each limiter will become less negative or positive, and current flows in the limiter tube systems and through resistances R10 and R11 respectively.

The drop in potential in these resistances is applied to the grids 113 and 123 respectively to bias these control grids of the second electron discharge system in each limiter to cut off so that we have negative cut off on the positive cycles of the signals in the second electron discharge system of each limiter stage.

Means in the form of a by-pass connection 140 is provided in order that the limiting stages may be by-passed so that unlimited energy is supplied from the amplifier stage 100 over lead 140 to the input of the amplifier stage 130, or the limiter may be included between the stages 130 and 100. This connection is provided in an embodiment for testing purposes. The results obtained with and without the limiter in the system can be compared. By-passing the limiter also adapts the system to the reception of amplitude modulated signals. Then output from either of the diode detectors A and B may be used or arrangement may be made to take the diode outputs in parallel.

The motor control circuit is also shown in Fig. 2 in its relation to the squelch tube which is connected to the second limiter stage 120 in the unit 30. The motor control circuit in Fig. 1 and Fig. 2 comprises two tubes 150 and 150′ having their first grids 151 and 151′ connected to the points D1 and D2. These tubes 150 and 150′ also have their second grids 154 and 154′ connected with a source of alternating current such as, for example, to the alternating current supply for the filaments of the tubes and for the one phase winding 18 of the motor M. The tubes 150 and 150′ are differentially arranged with respect to their inputs so that the alternating current supplied to the grids 154 and 154′ excite these grids differentially. The anodes 163 and 163′ of these tubes are tied together and coupled to the control grid 188 of amplifier stage 190. The tubes 150 and 150′ are so operated that in the presence of about zero bias at the points D1 and D2, the two halves of the alternating current cycle applied differentially to the control grids are amplified and repeated in the tubes to appear at the point 170 and mutually cancel, so that no alternating current is supplied by this control circuit to the motor winding 20. The motor then is at rest. When the receiver is properly tuned, the D. C. voltage at 90 supplied by lead AFC and switch S2 to point D1 or D2 is of about zero value.

When the potential at one point, say D1, is changed due to a change of the voltage at the point 90, the output of one or the other of the tubes 150 and 150′ predominates to supply at the point 170 a voltage of a particular phase, depending upon whether the frequency of the signal out of limiter 30 has increased or decreased.

The relative amplitude of the alternating current excitation fed to the grids 154 and 154′ is adjusted to the desired value by adjustable resistance 139 in series with fixed resistance 141. The potentiometer resistance 143 in series with the fixed resistances 145 and 146 provides means for adjusting the relative inputs of the tubes to obtain equal outputs from the tubes 150 and 150′ at the point 170. The output when present is coupled into the grid 188 of tube 190 by condenser 191 and resistances 193 and 195. This potential is amplified in the stage 190 and supplied from the anode of this tube to one phase winding 20 of the motor M. The excitation of the windings 18 and 20 is in phase quadrature. Generally, a phase shifting condenser 210 is included in one of the leads, for example, in the lead between the alternating current power supply and the winding 18. The motor then turns in a direction depending upon the polarity of the potential supplied at point D1 or D2 to retune the oscillator of the second heterodyne stage in unit 14 in a direction to correct the frequency at the output of the limiter. The adjustment 143 is provided so that the outputs of tubes 150 and 150′ can be made to cancel at point 170 when the D. C. input at points D1, D2 is zero. To indicate the condition of zero resultant A. C. voltage at 170, a voltage indicator is provided in the output of amplifier tube 190. This indicator is an "electric eye" tube 200 (6U5), the control grid of which is coupled to the output circuit of amplifier 190 through an A. C. voltage dividing network consisting of condenser 202, resistor 204, resistor 206, and condenser 208. The condenser 208 connected from the control grid to ground serves to by-pass harmonic frequencies that may be present in the output of amplifier 190.

As stated above, it is desirable to cut off or inhibit operation of the tuning motor M when the signal is lost or becomes of unusuable strength, and I have provided an improved means for doing this. The second limiter stage tube 120 is so adjusted and the signal levels and bias potentials are such that the grid 119 draws current when the normal signal level is present. This grid current, operating through the grid resistor 230, causes the direct current potential of the grid 119 to become biased negative. This negative voltage is connected by way of resistances 234, 236, and 238 to the control grid 240 of a squelch tube 244. With this negative bias on the control grid of the squelch tube, this tube does not draw current. The anode of the squelch tube is coupled to the anodes of the phase reversing tubes 150 and 150′ so that all of these tubes are supplied with plate current and potential from a common lead 250 connected to the positive terminal of a source the negative terminal of which is connected to ground. Sufficient current and potential is supplied by this lead to operate the phase reverser tubes, 150 and 150′ and excite the amplifier 190 under these circumstances; that is, no anode current to the tube 244. The motor control unit operates to supply to the winding 20 a current of one phase or the other when the system is out of tune. This allows the automatic frequency control circuit to function properly when signal of usable strength is present. In the absence of signal, the grid circuit of the first tube in second limiter stage 120 draws substantially zero current so that the potential drop in resistance 230 is reduced and a more positive potential is supplied to the grid 119 and thence by resistances 234, 236, and 238 to the control grid 240 of the squelch tube 244. The squelch tube 244 now draws current and the amount of current drawn by this tube is sufficient to rob the plate circuits of tubes 150 and 150′, thereby stopping excitation of the amplifier stage 190 and the motor winding 20.

As stated above, if the transmission is reversed, that is, mark is sent on the space frequency (frequency to which circuit SF is tuned), and space is sent on the mark frequency (frequency to which circuit MF is tuned), the recorded signals would be reversed, and the automatic tuner would operate to increase drift of the mean or average frequency. The reversing switches S1 and S2 which may be uni-controlled, provide means for reversing the response to the detector output and the input to the tuner motor control unit MCU to correct the recording and the tuning action.

In an embodiment the received signals are between 10 and 15 megacycles. The frequency band from mark frequency to space frequency is in one case 200 cycles, in another case 400 cycles. An I. F. unit had a band width of 225 cycles at −3 db.

The signal is first converted to 300 kc. out of unit 10. An oscillator operating at 250 kc. is used in 14 as tuned by capacitor 16, and the output from unit 14 to the current amplitude limiter in 30 is at 50 kc.

The circuit connections between discriminator detector outputs A and B and the tuning motor control unit MCU, and the compensating circuit may be modified as illustrated in Fig. 3. In Fig. 3 the numerals correspond, in so far as possible, to the numerals used in Fig. 1.

In Fig. 3 as in Fig. 1, the direct current voltage developed across resistances 36 and 38 is supplied through switch S1 over the filter circuit FC and potentiometer 46 to the keying tube 50. The potential developed in these resistances is also supplied by switch S1 to resistance 72 and condenser 74 in series to develop at point 90 a control potential which is substantially zero when the system is in tune and varies thereabout corresponding to shifts in the mean frequency of the frequency shift energy being received. This potential is as in Fig. 1 supplied by switch S2 to the points D1 or D2 of the tuning motor control unit MCU. The tube 80 as in Fig. 1, has its control grid supplied with the negative and positive potentials developed at the point 40 and this tube, as in the prior embodiment, is so biased at its grid that it is operated beyond cutoff in the presence of the negative voltages developed at 40. Moreover, the source of direct current at this time then supplies through potentiometer resistor 82′, and adjustable resistance 86′, and resistance 88′ a positive potential to the point 90 which just cancels the negative potential developed at point 90 by the detector output which in this embodiment and in the embodiment of Fig. 1 would be of the order of, but somewhat less than, −5 volts. When a positive potential is developed by the point 40 the negative cutoff bias on the tube 80 is overcome and the plate current flows in this tube to supply to the point 90 a negative potential which is sufficient to cancel the positive potential developed at point 90 due to the positive potential supplied by the detector output at 40. By adjustment of potentiometer 82′ and with proper values of resistance at resistors 86′, and 88′, and 89′, the value of the compensating voltages ± supplied to the point 90 can be made equal to the voltages fed to the point 90 from detectors A and B. The resistance in the grid circuit of the tube 80 limits the current in the grid circuit so that the potential at the point 90 reaches a fixed value in the presence of a positive potential on the grid 79. In other words, the tube 80 in this embodiment, as in Fig. 1, operates to limit the direct current voltages in both directions so that the compensating voltages at the point 90 are substantially equal and of a limited value depending on the compensating circuit adjustment. The tube 80 then operates as a limiter for the produced direct current voltages of opposed phase produced at point 90. Then when the voltages at the point 40 are no longer symmetrical with respect to a base value say zero potental they are not completely cancelled at the point 90, and residual voltage of one sign or the other, depending upon the direction in which the main frequency of the frequency shifted wave energy has changed, is developed at point 90. This voltage is then supplied to the tuner to reestablish tuning of the receiver at a point at which the mean frequency of the wave energy is located between the frequencies to which the circuits MF and SF are tuned.

In the embodiment of Fig. 1 the cathode of tube 80 is connected directly to ground. In the embodiment of Fig. 3 the cathode is tapped to a potentiometer 83, one end of which is grounded and the other end of which is connected to a positive direct current source. This permits adjustment of the grid bias of this tube as desired. The potentiometer resistance 82′ may be calibrated in cycles shift, to facilitate setting it to conform to the degree of frequency shift being used.

What is claimed is:

1. In a modulated wave receiver, modulated wave pickup means, tunable wave translating apparatus having an input coupled to said pickup means and excited by current representing said modulated wave energy, said translating apparatus including tuning means and at least one electron control device stage, a modulated wave detector in said translating apparatus, a tuning means control circuit coupling said detector to said tuning means, and a circuit excited by a potential developed in said one control device stage for disabling said control circuit in the absence of signal input to said translating apparatus.

2. In a wave receiver, an oscillation generator and tuning means therefor, a mixer stage wherein a signal wave and oscillations from said generator are mixed, a current amplifier having at least one electron control device stage coupled to the mixer stage, a detector coupled to the amplifier, a tuning means control circuit coupling said detector to said tuning means, and a circuit excited by a potential developed in said one control device stage for disabling said control circuit in the absence of signal wave input to said mixer stage.

3. In a frequency modulated wave receiver, an oscillator and automatic tuning means therefor, a mixer stage wherein frequency modulated signals and oscillations from said oscillator are mixed, a current amplitude limiter having at least one tube stage coupled to the mixer, a frequency discriminator and detector coupled to the limiter, a tuning means control circuit coupling said detector to said automatic tuning means, and a circuit excited by a potential developed in said one tube stage for disabling said control circuit in the absence of signal input to said mixer stage.

4. In a receiver for wave energy keyed in accordance with signals from a first frequency to a second frequency, detecting means for deriving from said signals a direct current potential which varies between two values equally spaced from a base value when said receiver is properly tuned and unequally spaced from said base value when said receiver is improperly tuned, a variable reactance for tuning said receiver, a first terminal on which said derived potential appears, an electron control device having a control electrode and output electrodes, apparatus coupling said output electrodes to said reactance, said apparatus being responsive to the output of said device and acting to vary said reactance to tune said receiver, a resistance and a condenser between said first terminal and a point of about zero direct current potential, a coupling between the junction point of the condenser and resistance and the control electrode of said device, an electron control device having an output electrode and a control electrode, a coupling between said control electrode and said first terminal, a network including resistances and a source of direct current potential coupling said output electrode to said point of about zero direct current potential, a coupling between an intermediate point on a resistance of said network and said junction point, the coupling between said last-named control electrode and said first terminal serving to bias the control electrode of said last-named device to cutoff in the presence of the least positive direct current potential at said first terminal.

5. In a modulated wave receiver, a tunable amplifier having an input excited by wave energy keyed from a first frequency to a second frequency, said amplifier including tuning means and having at least one tube stage, a discriminator and detector coupled to the amplifier for deriving a direct current potential which varies, as the wave energy is keyed, substantially symmetrically above and below a base value when said amplifier is properly tuned, a tuner control circuit coupled to said tuning means, a coupling between said detector output and said tuner control circuit, means in said coupling for providing a resultant direct current potential of zero as a result of symmetrical variation of said first-named potential about said base value, and a circuit excited by a potential developed in said one tube stage for disabling said tuner control circuit in the absence of signal input to said amplifier.

6. In a frequency shift receiver, a tunable amplifier having an input excited by wave energy keyed from a first frequency to a second frequency, said amplifier including tuning means and having at least one tube stage operating as a current amplitude limiter, a discriminator and detector coupled to the current amplitude limiter for deriving a direct current potential which varies, as the wave energy is keyed, substantially symmetrically above and below a base value when said amplifier is properly tuned, a tuner control circuit, including a second tube and its anode supply circuit, coupled to said tuning means, a coupling between said detector output and said tuner control circuit, a third tube means coupled to said detector output for providing a resultant direct current potential of zero as a result of symmetrical variation of said first-named potential about said base value, said resultant potential being applied to said tuner control circuit by means of said coupling between the detector output and the tuner control circuit, a fourth tube means having an anode supply circuit common in part at least with said first anode supply circuit, and means for exciting said fourth tube by a potential developed in said one tube stage for disabling said tuner control circuit in the absence of signal input to said tunable amplifier.

7. In a frequency shifted wave receiver, an oscillation generator and a tuning reactance therein for controlling its frequency of operation, a mixer stage wherein frequency shifted currents representing received energy and oscillations from the generator are mixed, a current amplifier having an input and output and including one electron control device stage operating as a current amplitude limiter, a coupling between said mixer and the input of said current amplifier, a detector coupled to the current amplifier output, a tuning reactance control circuit coupled to said detector output and operatively connected to said tuning reactance, and a circuit excited by a potential developed in said limiter stage for disabling said tuner control circuit in the absence of signal input to said mixer stage.

8. A frequency shifted wave receiver as recited in claim 7 wherein said tuning reactance control circuit includes an electron discharge device having a control electrode coupled to said detector output and having output electrodes operatively connected to said tuning reactance and wherein said last named circuit includes an additional device having a control electrode coupled to said one device stage and having output electrodes in parallel with the output electrodes of said electron discharge device and a common source of direct current potential for the output electrodes of said discharge device and said additional device.

HAROLD O. PETERSON.

REFERENCES CITED

The following references are of record in the file of this patent:

UNITED STATES PATENTS

| Number | Name | Date |
|---|---|---|
| 1,804,526 | Coxhead | May 12, 1931 |
| 1,907,965 | Hansell | May 9, 1933 |
| 2,157,834 | Schmidt, Jr. | May 9, 1939 |
| 2,211,750 | Humby et al. | Aug. 20, 1940 |
| 2,241,937 | Trevor | May 13, 1941 |
| 2,251,064 | Martin et al. | July 29, 1941 |
| 2,266,052 | Linder | Dec. 16, 1941 |
| 2,267,453 | Foster | Dec. 23, 1941 |
| 2,283,523 | White | May 19, 1942 |
| 2,342,797 | Norton | July 20, 1943 |
| 2,368,052 | Unger | Jan. 23, 1945 |